US 8,820,461 B2

(12) United States Patent
Shinde et al.

(10) Patent No.: US 8,820,461 B2
(45) Date of Patent: Sep. 2, 2014

(54) ELECTRIC THREE-WHEELED VEHICLE

(75) Inventors: Yasuo Shinde, Wako (JP); Koichiro Honda, Wako (JP); Kazunori Kuroda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 13/432,530

(22) Filed: Mar. 28, 2012

(65) Prior Publication Data

US 2012/0247856 A1 Oct. 4, 2012

(30) Foreign Application Priority Data

Mar. 31, 2011 (JP) ................. 2011-080330

(51) Int. Cl.
*B60L 11/18* (2006.01)
*B60K 1/04* (2006.01)
*B62K 5/025* (2013.01)
*B62K 5/10* (2013.01)

(52) U.S. Cl.
CPC . *B62K 5/025* (2013.01); *B60K 1/04* (2013.01); *B60Y 2200/12* (2013.01); *B60K 2001/0416* (2013.01); *B60Y 2200/122* (2013.01); *B62K 2208/00* (2013.01); *B60K 2001/0422* (2013.01); *B62K 5/10* (2013.01)
USPC ........................................................ 180/216

(58) Field of Classification Search
CPC .... B62K 5/027; B62K 2208/00; B62K 5/025; B62K 5/10; B60K 2001/0416; B60K 2001/0422; B62J 99/00; B60Y 2200/122; B60Y 2200/12
USPC ........................... 180/216, 65.31, 68.5, 65.25
See application file for complete search history.

(56) References Cited

U.S. PATENT DOCUMENTS

| 3,369,629 | A | * | 2/1968 | Weiss ............................ 180/208 |
| 4,111,274 | A | * | 9/1978 | King et al. ................. 180/206.2 |
| 5,460,234 | A | * | 10/1995 | Matsuura et al. ............ 180/65.1 |
| 5,561,359 | A | * | 10/1996 | Matsuura et al. ............ 180/68.2 |
| 5,890,545 | A | * | 4/1999 | Smith et al. .................... 172/200 |
| 5,950,755 | A | * | 9/1999 | Kemmerer et al. ........... 180/216 |
| 6,021,862 | A | * | 2/2000 | Sharan .......................... 180/216 |
| 6,158,542 | A | * | 12/2000 | Nolet ......................... 180/206.2 |
| 6,267,190 | B1 | * | 7/2001 | Micheletti ..................... 180/183 |
| 6,276,480 | B1 | * | 8/2001 | Aregger ........................ 180/213 |
| 6,530,445 | B1 | * | 3/2003 | Flowers et al. ............... 180/208 |
| 2009/0000835 | A1 | * | 1/2009 | Jones et al. .................. 180/65.1 |
| 2009/0020352 | A1 | * | 1/2009 | Horii et al. .................... 180/212 |
| 2009/0250289 | A1 | | 10/2009 | Kifuku |

FOREIGN PATENT DOCUMENTS

| DE | 19732430 A1 | 2/1999 |
| EP | 1300126 A1 | 4/2009 |
| JP | 05-161221 A | 6/1993 |

* cited by examiner

*Primary Examiner* — J. Allen Shriver, II
*Assistant Examiner* — Brian Cassidy
(74) *Attorney, Agent, or Firm* — Squire Patton Boggs (US) LLP

(57) ABSTRACT

An electric vehicle can include a pair of left and right rear wheels configured to be driven by the rotary driving power of a motor supplied with electric power from a battery. A rear body can support the motor and rear wheels, and is attached at the back of a body frame. A battery box houses at least the battery, and is supported by a battery box supporting frame joined to the body frame below a seat of the vehicle. A monitoring board monitors the state of the battery, and can be located on top of the battery. A BMU collects information from the monitoring board, and a contactor opens and closes the connection between the battery and a drive circuit for the motor. The BMU and the contactor are housed in the battery box and in front of the battery.

18 Claims, 12 Drawing Sheets

ELECTRIC THREE-WHEELED VEHICLE

BACKGROUND

1. Field

The present invention relates to vehicles such as electric three-wheeled vehicles and more particularly to electric vehicles which run by driving a pair of left and right rear wheels by the driving power of a motor.

2. Description of the Related Art

In the past, there have been known saddle-ride type electric three-wheeled vehicles in which a front fork attached to the forward side of a body frame supports a front wheel and a rear body vertically swingable and transversely tiltable with respect to the body frame is attached on the rearward side of the body frame and a pair of left and right rear wheels driven by a motor are supported on the rear body.

Patent Literature 1 (JP-A No. Hei5-161221) discloses an electric three-wheeled vehicle in which a motor, a drive system for transmitting the rotary driving power of the motor to rear wheels and various electric components such as a battery and PDU are attached to a rear body which is vertically swingable and transversely tiltable with respect to a body frame (see FIG. 13).

However, in the technology described in Patent Literature 1, the battery, motor, drive system, various electric components and so on are all mounted on the rear body and swing vertically and transversely. The overall weight of the rear body, namely the unspring weight of the rear wheel suspension, tends to be large, which may affect the road surface followability of the rear wheels. It also has a problem that if the overall weight of the rear body increases and the roll moment of the three-wheeled vehicle is larger, the rigidity of the swing mechanism, etc. joined to the body frame must be increased and in terms of front/rear weight distribution, the rear weight of the vehicle body will be larger than the front weight thereof, affecting the steerability of the vehicle.

SUMMARY

An object of embodiments of the present invention is to address the above problem of the related art and provide an electric three-wheeled vehicle in which an electric power unit swings vertically and transversely and the locations and arrangement of a battery and various electric components are specially designed to enhance steerability, etc. without an increase in the weight of the vehicle.

In order to achieve the above object, embodiments of the present invention can have a first feature that in an electric three-wheeled vehicle runs by driving a pair of left and right rear wheels by rotary driving power of a motor supplied with electric power from a battery. A rear body including the motor and the rear wheels can be attached at the back of a body frame in a vertically swingable and transversely tiltable manner. A battery box can house at least the battery, and is supported by a battery box supporting frame joined to the body frame below a seat of the electric three-wheeled vehicle. A monitoring board is configured to monitor the state of the battery, and can be located on a top of the battery. A BMU is configured to collect information from the monitoring board. A contactor can be configured to open and close a connection between the battery and a drive circuit for the motor. These units can be housed in the battery box, and in front of the battery.

A second feature can be that the body frame has a main frame joined to a head pipe for pivotally supporting a steering stem in a rotatable manner, extending downward in a vehicle rearward direction. A pair of left and right side frames can be joined to the main frame, extending in the vehicle rearward direction. A pair of left and right standing frames can be joined to the side frames, extending upward in the vehicle rearward direction. A pair of left and right rear frames can be joined to the standing frames, extending in the vehicle rearward direction. The battery box supporting frame is supported by a cross pipe in a vehicle transverse direction which interconnects the left and right standing frames.

A third feature can be that the battery box supporting frame is so formed as to extend from the cross pipe toward a vehicle forward direction and the battery box is located above the cross pipe and above the battery box supporting frame.

A fourth feature can be that a charge port to be connected with an external power supply to charge the battery is provided at a top of the contactor.

A fifth feature can be that the vehicle has a supporting frame standing upward from the body frame behind the seat, and a down regulator for decreasing a voltage of an external power supply for charging the battery is attached to the supporting frame.

A sixth feature is that a charge port for the battery is provided on a vehicle center side of the supporting frame.

A seventh feature is that a low-voltage battery is located below the seat and a charge port is provided between the contactor and the low-voltage battery.

An eighth feature is that a PDU as a motor control device is located in front of the motor.

According to the first feature, the battery box for housing at least the battery is supported by the battery box supporting frame joined to the body frame below the seat of the electric three-wheeled vehicle. The monitoring board for monitoring the state of the battery is located on the top of the battery, and the BMU for collecting information from the monitoring board and the contactor for opening and closing the connection between the battery and the drive circuit for the motor are housed in the battery box and in front of the battery. Other electric components are also housed while supported by the battery box supporting frame of the vehicle below the seat. As a result, the unspring weight of the rear suspension is smaller than in a configuration that the battery is attached to the rear body attached to the body frame in a vertically swingable and transversely tiltable manner and thus the road surface followability of the rear body is enhanced.

Furthermore, since the heavy battery is located below the seat, in terms of front/rear weight distribution the weight is rather concentrated in the center of the vehicle, thereby increasing the steerability and driving performance of the vehicle. In addition, since the rear body does not include the battery, the degree of freedom in the rear body design is increased.

Also, since the monitoring board for monitoring the state of the battery, the BMU for collecting information from the monitoring board and the contactor for opening and closing the connection between the battery and the drive circuit for the motor are housed in the battery box, electric components can be protected all together against water more easily than in a configuration that the monitoring board, BMU and contactor are located on the rear body and also further mass concentration is achieved, leading to improvement in the driving performance of the vehicle.

Furthermore, a good front/rear weight distribution can be achieved because the heavy battery is located below the seat. In addition, since the BMU and contactor are located in front of the battery in the vehicle longitudinal direction, the battery, BMU and contactor can be accessed by opening the seat, which facilitates maintenance of them. Also, electric components which must be placed in a watertight environment are placed in the watertight space below the seat.

According to the second feature, the body frame has a main frame joined to the head pipe for pivotally supporting the steering stem in a rotatable manner, extending downward in the vehicle rearward direction. A pair of left and right side frames can be joined to the main frame, extending in the vehicle rearward direction. A pair of left and right standing frames can be joined to the side frames, extending upward in the vehicle rearward direction. A pair of left and right rear frames can be joined to the standing frames, extending in the vehicle rearward direction. The battery box supporting frame can be supported by the cross pipe in the vehicle transverse direction which interconnects the left and right standing frames, so the battery can be stably fixed by frame members joined to the body frame. Also, since the standing frames are located on the left and right in the vehicle transverse direction, the battery is prevented from being affected by an external force.

According to the third feature, the battery box supporting frame is formed so as to extend from the cross pipe toward the vehicle forward direction and the battery box is located above the cross pipe and above the battery box supporting frame, so the battery is supported not only laterally but also from below. Thus, the battery is supported with higher stability.

According to the fourth feature, the charge port to be connected with an external power supply to charge the battery is provided at the top of the contactor, so the charge port can be accessed by opening the seat, thereby simplifying charging. Also, the water-tightness of the charge port is increased.

According to the fifth feature, the vehicle has a supporting frame standing upward from the body frame behind the seat and the down regulator for decreasing the voltage of an external power supply for charging the battery is attached to the supporting frame. As a result, the supporting frame, which constitutes the backrest for an occupant and supports the roof member, can be used to install the down regulator in a place where the heat radiation efficiency is high.

According to the sixth feature, the charge port for the battery is provided on the vehicle center side of the supporting frame, so the supporting frame can be used so that the charge port is located in a high position of the vehicle to simplify charging.

According to the seventh feature, the low-voltage battery is located below the seat and a charge port is provided between the contactor and the low-voltage battery. As a result, if an exterior component with an openable/closable cover is provided below the seat, charging of the high-voltage battery, inspection of the low-voltage battery and so on can be carried out by opening the cover.

According to the eighth feature, the PDU as a motor control device is located in front of the motor, so the distance of a three-phase cable for supplying power from the PDU to the motor can be shortened, thereby reducing transmission loss and noise contamination.

DETAILED DESCRIPTION

Figure 1:
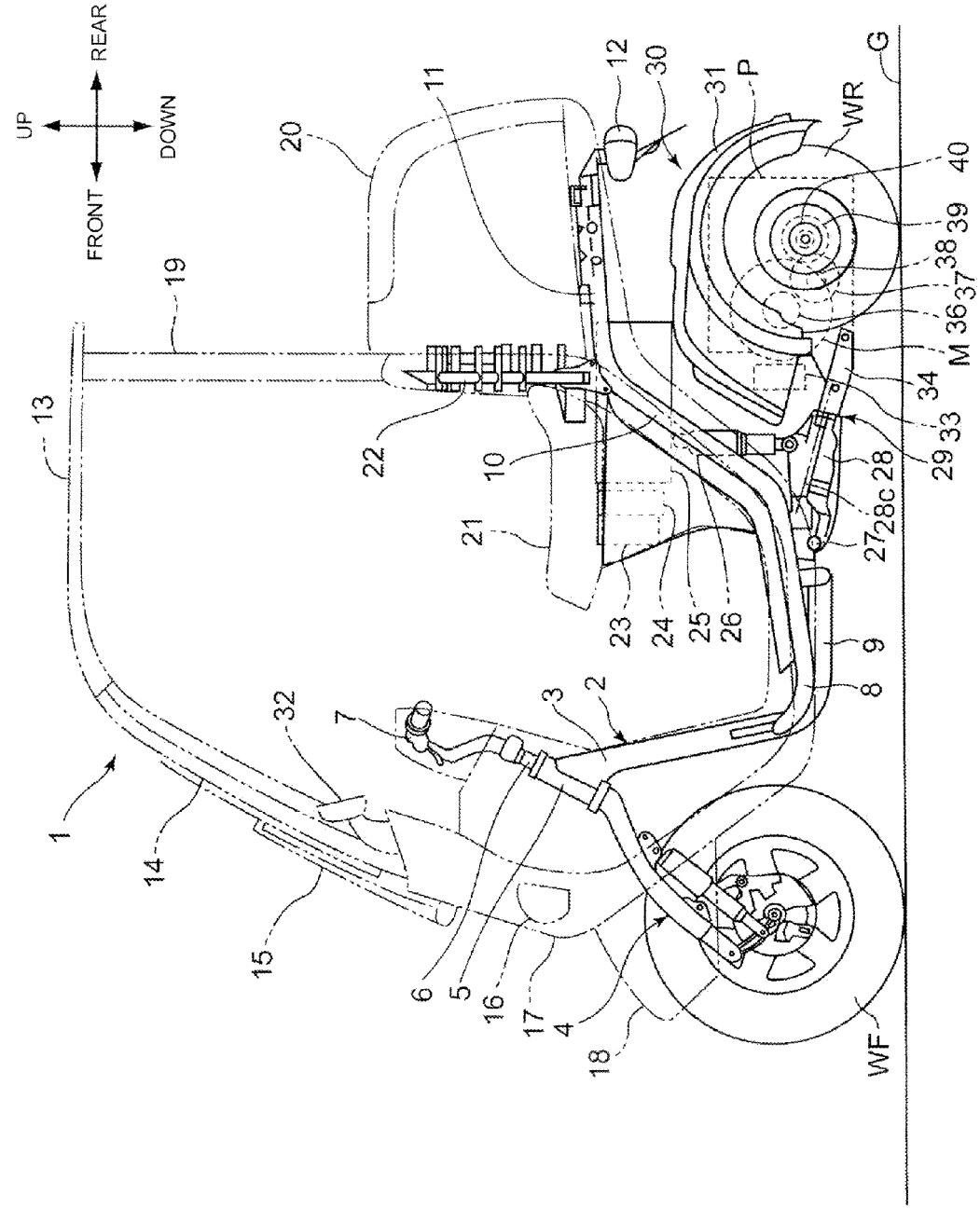
FIG. 1 is a side view of an electric three-wheeled vehicle according to an embodiment of the present invention.

Embodiments of the present invention will be described in detail referring to drawings. FIG. 1 is a side view of an electric vehicle 1 according to an embodiment of the present invention. The electric vehicle 1, in this example, is a saddle-ride type three-wheeled vehicle which runs by driving a pair of left and right rear wheels WR by the rotary driving power of a motor M. A head pipe 5 for pivotally supporting a steering stem 6 in a rotatable manner is attached to the front end of a main frame 3 which constitutes a body frame 2. A steering handlebar 7 is attached to the top of the steering stem 6 and a bottom link type suspension (front fork) 4 for pivotally supporting a front wheel WF in a rotatable manner is attached to its bottom.

An under frame 9 in the center in the vehicle transverse direction is joined to the lower part of the main frame 3 and side frames 8 extending in the vehicle rearward direction on the left and right are also attached to it. The rear end of the under frame 9 is joined to the side frames 8 by a connecting pipe oriented along the vehicle transverse direction. The rear parts of the pair of left and right side frames 8 are joined to a pair of left and right standing frames 10 joined to rear frames 11 extending in the vehicle rearward direction respectively.

A vertical swing unit 28 is supported by a pivot shaft 27 in a vertically swingable manner behind the rear end of the under frame 9 under the side frames 8. The upper part of the vertical swing unit 28 is suspended from the standing frames 10 by a rear shock unit 26 located in the center in the vehicle transverse direction. A tilting member 34 which can rotate around a rotary shaft 28c oriented along the vehicle longitudinal direction with its front inclined upward is journaled to the rear end of the vertical swing unit 28.

A damper such as a Neidhardt type damper (not shown) which gives a damper effect to the rotation of the tilting member 34 in a relative rotation part 29 is housed inside the vertical swing unit 28. The tilting member 34 is fixed on a rear body 30 including a pair of left and right rear wheels WR and the motor M. Due to this structure, the electric three-wheeled vehicle 1 provides a rear wheel suspension to swing the whole rear body 30 vertically and also enables the body frame 2 to do tilting motion (banking motion) on the relative rotation part 29 with respect to the rear body 30 to turn and run while the left and right rear wheels WR are on the road surface G.

The rear body 30 includes a power unit P including the motor M and a pair of rear wheels WR is journaled to the power unit P in a rotatable manner. The rotary driving power of the motor M with a motor output shaft 36 is transmitted from the axle 40 to the rear wheels WR through a counter gear 37 fixed on a counter shaft 38 and an output gear 39 located coaxially with the axle 40.

A PDU 33 as a motor control device (motor driver) is located on the vehicle forward side of the motor M. Since the PDU 33 and motor M are close to each other, the length of a three-phase cable for supplying power from the PDU 33 to the motor M can be shortened and power transmission loss and noise contamination can be reduced. Also, since the PDU 33 is located in a forward position of the rear body 30, its heat radiation efficiency is increased. The upper portion of the power unit P is covered by a body cover 31 which also functions as a mudguard for the rear wheels WR.

A high-voltage battery 25 which supplies power to the motor M is located on the body frame 2. The battery 25, virtually a rectangular parallelepiped, is located between the pair of left and right standing frames 10 with its lengthwise side oriented along the vehicle longitudinal direction. A BMU 24 as a battery control device and a contactor 23 are located in front of the battery 25. The BMU 24 has a function to collect information from a monitoring board 54 (see FIG. 4) for monitoring the state of the battery 25. The contactor 23 is an electric component which has a function to open and close the connection between the battery 25 and the drive circuit for driving the motor M.

An arch-like supporting frame 22 which is curved in a projecting form toward the vehicle upward direction is fitted on a part bent between the standing frames 10 and the rear frames 11. The rear end of the battery 25 is in a more rearward position than the joint of the supporting frame 22.

A front cowl 17 with a headlight 16 is located on the vehicle forward side of the head pipe 5. A pair of left and right rearview mirrors 32, a windshield 14 and an electric wiper 15 for the windshield 14 are attached to the upper part of the front cowl 17. A front fender 18 is attached above the front wheel WF. The upper end of the windshield 14 is joined to a roof member 13 which functions as a rain hood for an occupant and the rear of the roof member 13 is joined to a strut 19 supported by the supporting frame 22. A large trunk 20 is located between the supporting frame 22 and the rear frames 11 and a tail lamp unit 12 is located at the rear ends of the rear frames 11.

A seat 21 is located on the vehicle forward side of the supporting frame 22 and the contactor 23, BMU 24, and battery 25 are located under the seat 21. Due to this configuration, various electric components such as the battery 25 as a heavy item, the contactor 23 and the BMU 24 can be located around the center of the vehicle body, permitting mass concentration. Also, the rear body 30, which can swing vertically and tilt transversely with respect to the body frame 2, can be lighter than in a configuration in which the battery and so on are located on the rear body, so the unsprung weight of the rear wheel suspension can be reduced to improve the road surface followability of the rear wheels WR. Furthermore, since the rear body 30 is lighter, the swing mechanism and the framework of the rear body 30, etc. are not required to have a very high rigidity, permitting structural simplification and improvement in the degree of freedom in design.

Figure 2:
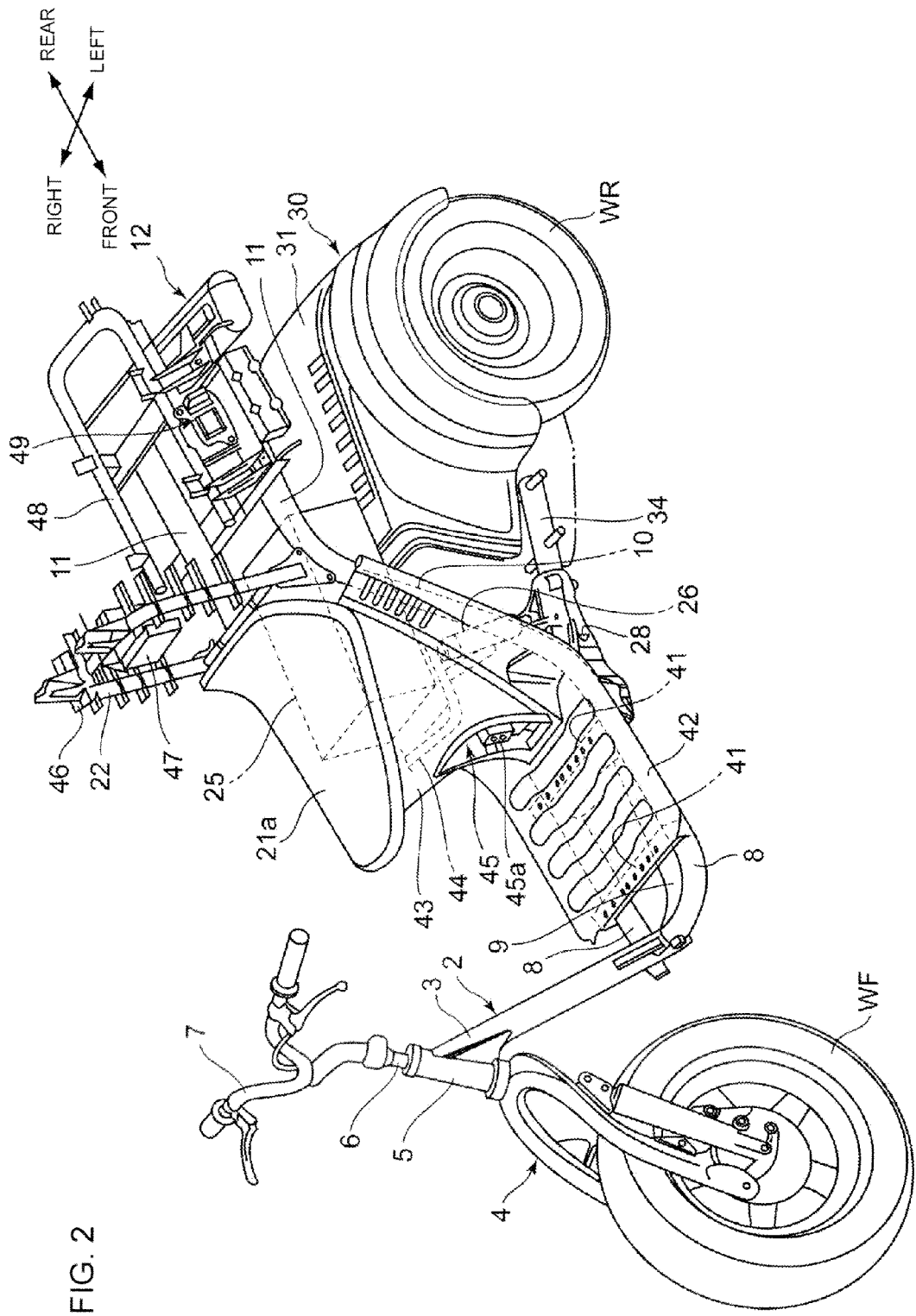
FIG. 2 is a perspective view of the electric three-wheeled vehicle with main exterior parts removed.
Figure 3:
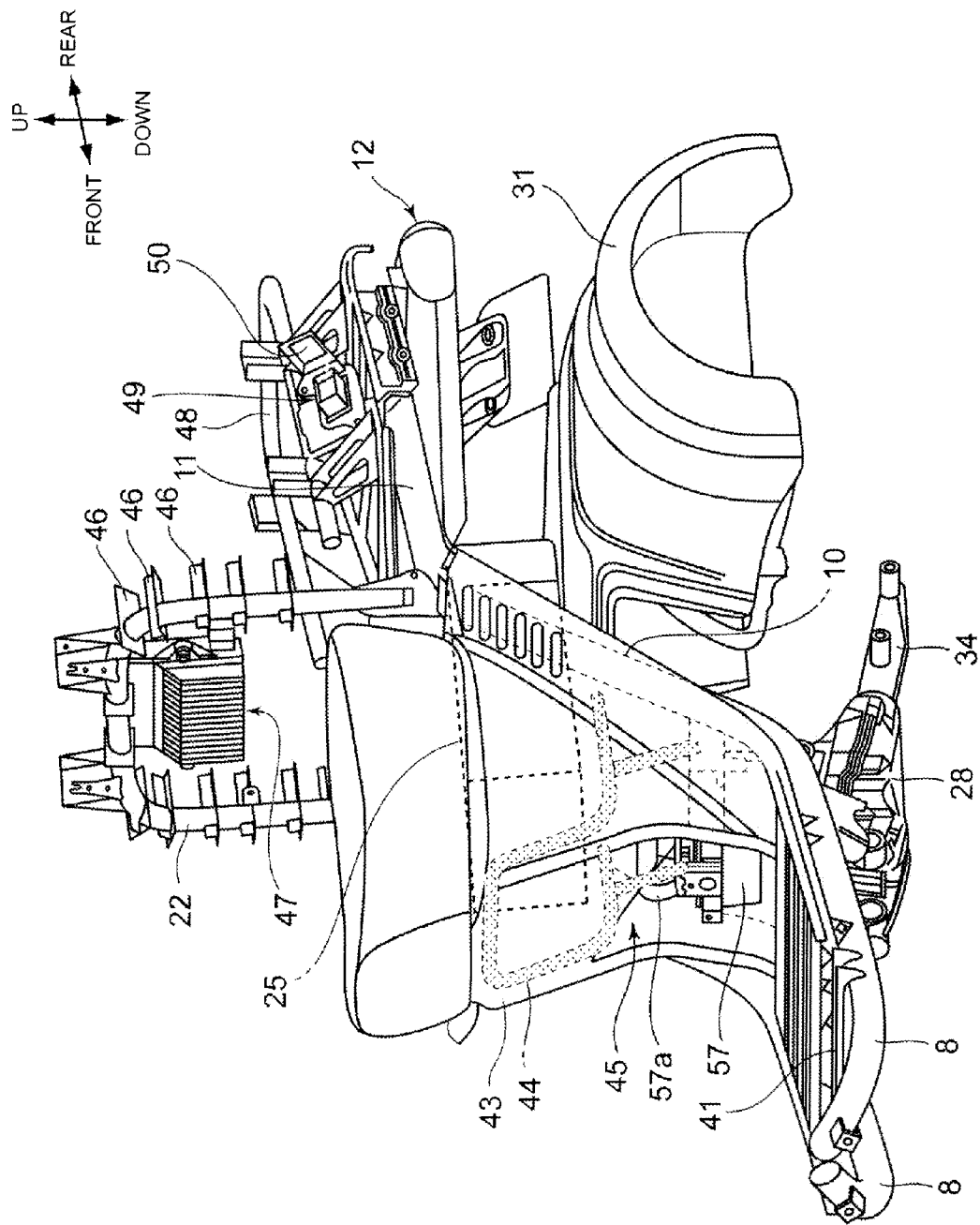
FIG. 3 is a perspective view of the electric three-wheeled vehicle shown in FIG. 2 as seen from a forward position of the vehicle.

FIG. 2 is a perspective view of the electric three-wheeled vehicle 1 with main exterior parts removed. FIG. 3 is a perspective view of the electric three-wheeled vehicle 1 shown in FIG. 2 as seen from a forward position of the vehicle. The same reference signs as the above denote the same or equivalent elements. Two supporting members 41 for supporting a foot rest floor 42 are located on the upper faces of the pair of left and right side frames 8 joined to the main frame 3 along the vehicle transverse direction. A seat cowl 43 for supporting the bottom plate 21a of the seat 21 is attached to the rear of the foot rest floor 42.

An opening 45 which is closed by an openable/closable cover member (not shown) is formed on the vehicle forward side of the seat cowl 43. A low-voltage battery 57 which supplies power to lamp units, etc. is located inside the opening 45. Inside the opening 45, a charge port 45a for charging the high-voltage battery 25 by an external power supply may be located above the low-voltage battery 57. This arrangement makes it possible to access both the charge port 45a and the low-voltage battery 57 only by opening the cover member on the opening 45.

The low-voltage battery 57 is held by a battery stay 57a joined to the standing frames 10. A battery box supporting frame 44 which surrounds the front and bottom of the battery 25 is located inside the seat cowl 43. The battery 25 is housed in a battery box 25a as a bottomed boxy vessel and the battery box 25a is fixed on the battery box supporting frame 44.

A down regulator 47 is suspended from, and fixed to, the upper pipe portion of the supporting frame 22, connected between the standing frames 10 and the rear frames 11, which is oriented along the vehicle transverse direction. Consequently the supporting frame 22 for supporting a backrest for an occupant and a roof member can be effectively used to install the down regulator 47 in a place for effective heat radiation.

A plurality of plate-like reinforcing plates 46 oriented along the vehicle longitudinal direction are attached to the supporting frame 22 so that even if an exterior plate (not shown) as a backrest is provided on the vehicle forward side of the supporting frame 22, the exterior plate is prevented from deforming due to an external force, in order to maintain the heat radiation efficiency of the down regulator 47. A reinforcing frame 48 for the trunk 20 and a battery charge port 49 with an openable/closable cover 50 may be provided above the rear frames 11.

Figure 4:
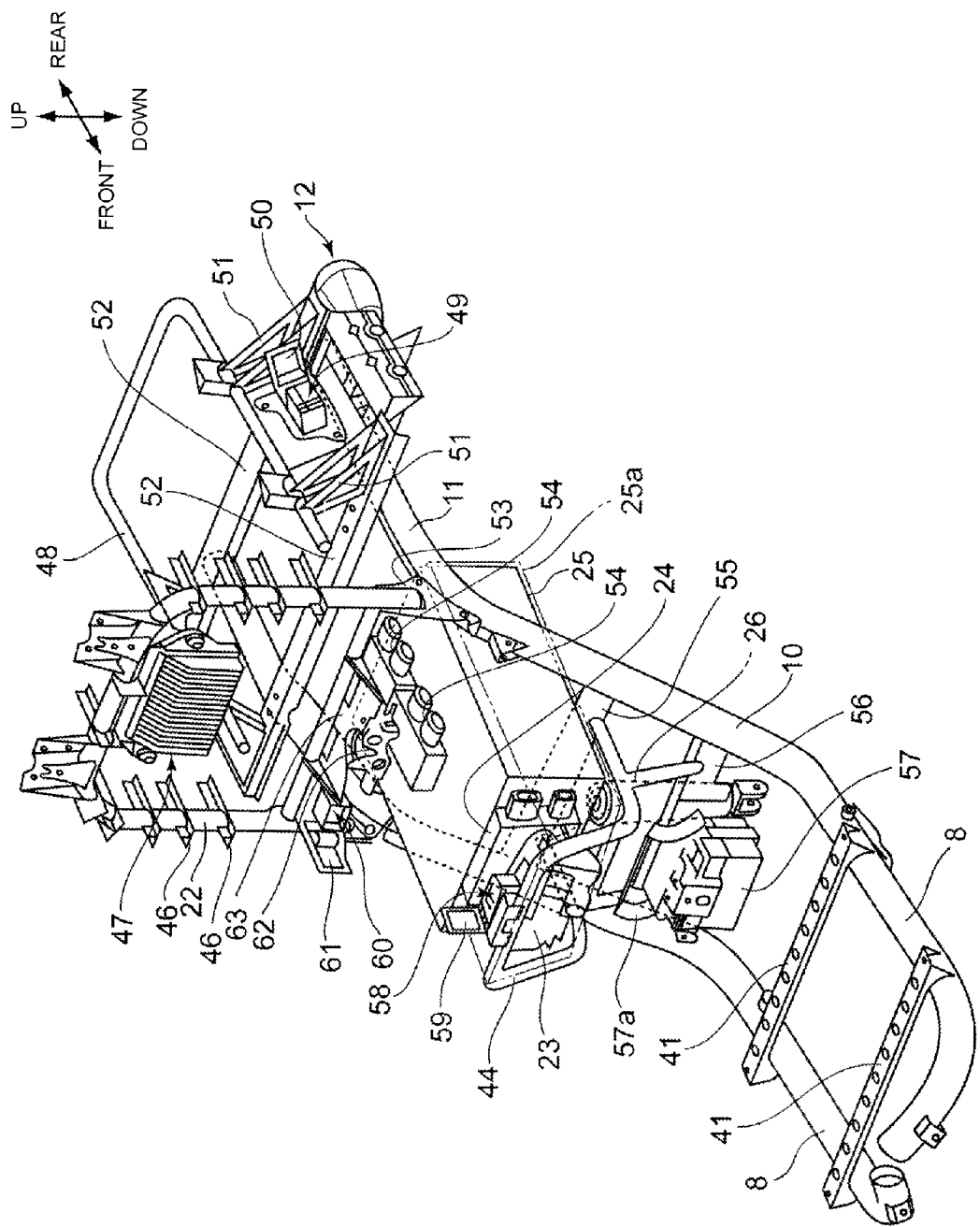
FIG. 4 is a perspective view of the body frame structure around a battery.

FIG. 4 is a perspective view of the body frame structure around the battery 25. The same reference signs as the above denote the same or equivalent elements. The pair of left and right standing frames 10 is transversely connected by an upper cross pipe 55 and a lower cross pipe 56 which are oriented along the vehicle transverse direction. The upper end of the rear shock unit 26 is supported by the upper cross pipe 55. Also the battery stay 57a is fixed on the lower cross pipe 56.

The battery box supporting frame 44 is joined to the front face of the upper cross pipe 55 and the oblique upper face of the lower cross pipe 56. The battery box supporting frame 44 is so formed as to extend toward the vehicle forward direction of the battery box 25a, then bend upward, and the battery box 25a is fixed above the upper cross pipe 55 in a way that its front side is covered by the battery box supporting frame 44.

The BMU 24 and contactor 23 are located between the front side of the battery 25 and the battery box supporting frame 44. The BMU 24 has a function to collect information from a monitoring board 54 (see FIG. 4) for monitoring the state of the battery 25 and the contactor 23 is an electric component which has a function to open and close the connection between the drive circuit for driving the motor M and the battery 25. In this embodiment, the BMU 24 and contactor 23 are also housed in the battery box 25a and in front of the battery 25.

A charge port 49 with an openable/closable cover 59 may be provided above the contactor 23. According to this configuration, it is possible to access the charge port 49 only by opening the openable/closable seat 21.

Two monitoring boards 54 for monitoring the state of the battery 25 are located on the upper surface of the battery 25. The supporting frame 22 is fixed through gussets 53 welded upright to the upper portions of the standing frames 10 and a supporting stay 63 for supporting a seat catch 62 is fitted between the left and right pipes of the supporting frame 22. The seat catch 62 has a function to hold the openable/closable seat 21 closed.

A charge port 60 with an openable/closable cover 61 may be located on the right of the seat catch 62 in the vehicle transverse direction and inside the supporting frame 22. According to this configuration, it is possible to provide a charge port in a high position of the vehicle using the supporting frame 22 to facilitate charging work. The electric three-wheeled vehicle 1 should have at least one charge port. For example, the reinforcing frame 48 for the trunk 20 can be supported by supporting members 51 erected from two cross frames 52 oriented along the vehicle transverse direction and functions as a stay for the battery charge port 49 with an openable/closable cover 50. However, the reinforcing frame 48, cross frames 52 and charge port 49 may be omitted in the electric three-wheeled vehicle 1.

Figure 10:
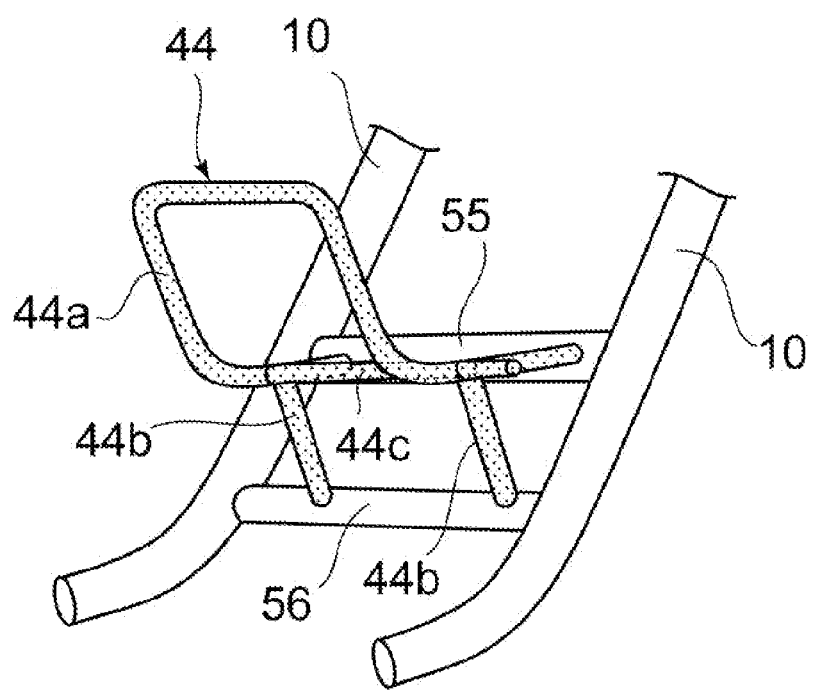
FIG. 10 is a perspective view of a battery box supporting frame.

Here, the supporting structure for the battery box 25a will be described referring to FIGS. 10 to 13. FIG. 10 is a perspective view of the battery box supporting frame 44. The battery box supporting frame 44 is comprised of a main pipe 44a joined to the upper cross pipe 55 and shaped to surround the front of the battery box 25a, a pair of left and right reinforcing pipes 44b extending downward from the lower parts of the main pipe 44a in the vehicle rearward direction and connected to the lower cross pipe 56, and a cross member 44c extending in the vehicle transverse direction and connecting the upper parts of the left and right reinforcing pipes 44b.

Figure 11:
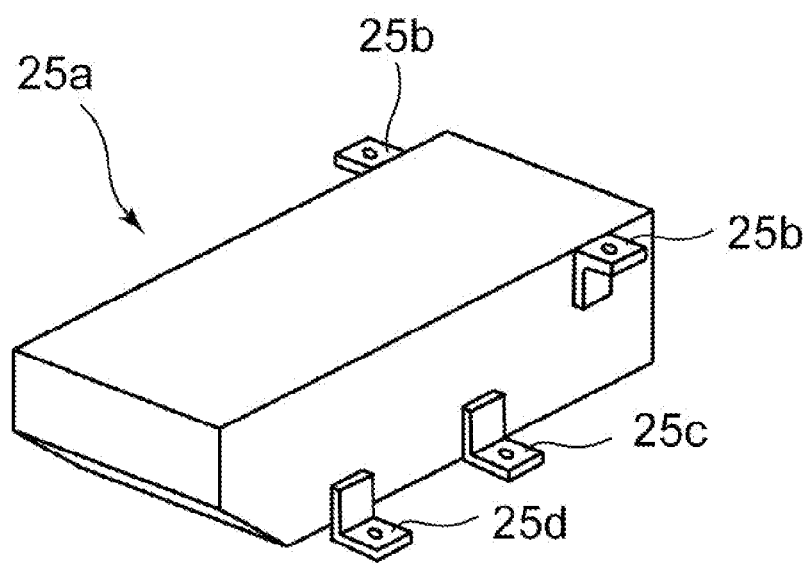
FIG. 11 is a perspective view of a battery box.

FIG. 11 is a perspective view of the battery box 25a. A plurality of mounting stays for fixation to the body frame 2 and battery box supporting frame 44 are provided on the battery box 25a. A pair of left and right front mounting stays 25d which are fixed on the upper surface of the cross member 44c are provided on the front bottom parts of the battery box 25a. Also a pair of left and right central mounting stays 25c which are fixed on the upper surface of the upper cross pipe 55 are provided on the central bottom parts of the battery box 25a. Also, rear mounting stays 25b which are fixed on the lower surfaces of the rear frames 11 are provided on the rear top parts of the battery box 25a.

Figure 12:
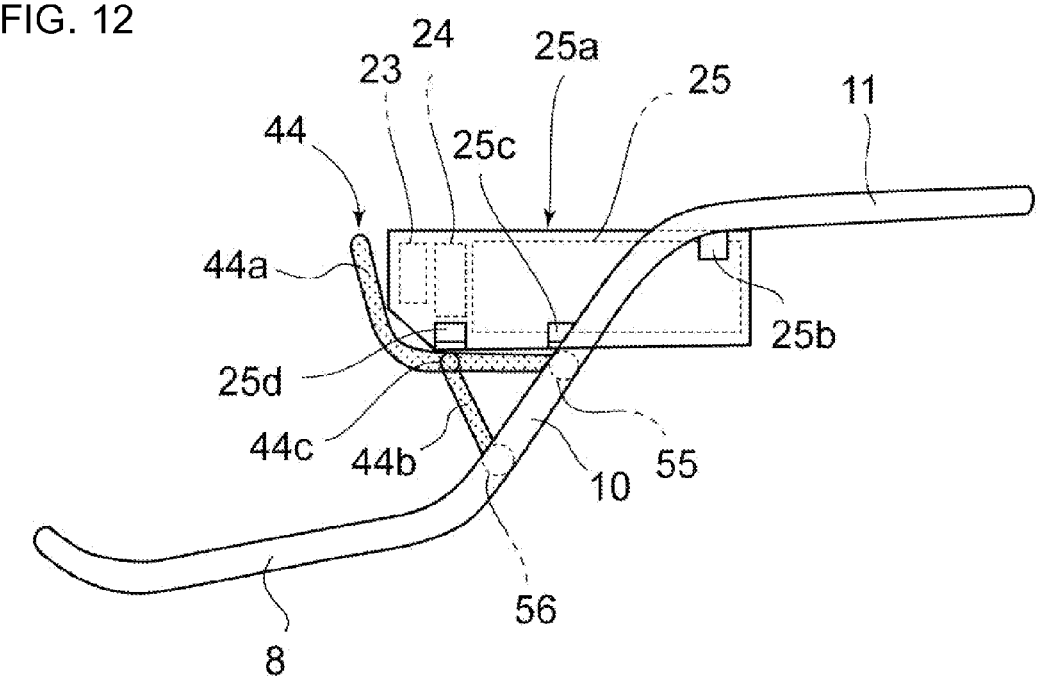
FIG. 12 is a side view of the battery box mounted on the battery box supporting frame.
Figure 13:
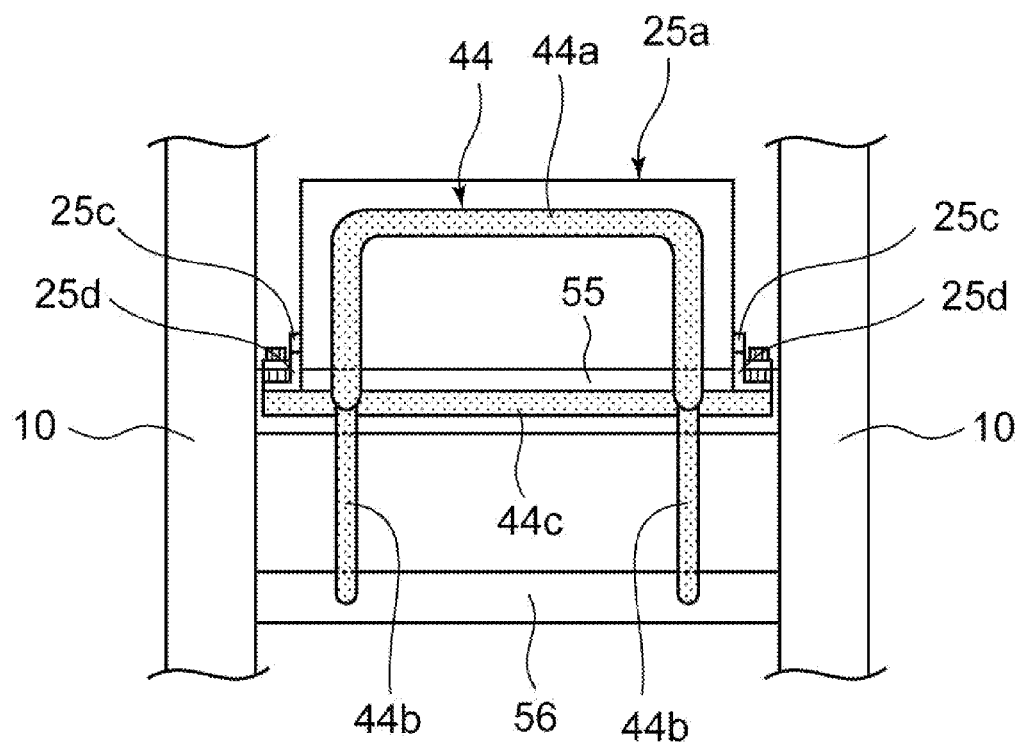
FIG. 13 is a front view of the battery box mounted on the battery box supporting frame.

FIG. 12 is a side view of the battery box 25a mounted on the battery box supporting frame 44. FIG. 13 is a front view thereof. The same reference signs as the above denote the same or equivalent elements. The battery box 25a according to this embodiment is fixed on the body frame 2 with a total of six mounting stays. Specifically, the battery box 25a is fixed on the cross member 44c of the battery box supporting frame 44 with the front mounting stays 25d and fastening members such as bolts and also fixed on the upper cross pipe 55 with the central mounting stays 25c, and further fixed on the rear frames 11 with the rear mounting stays 25b. Consequently, even when the battery box 25c is located in a way to considerably protrude from the standing frames 10 toward the vehicle rearward direction, the battery box 25c can be fixed stably.

Figure 14:
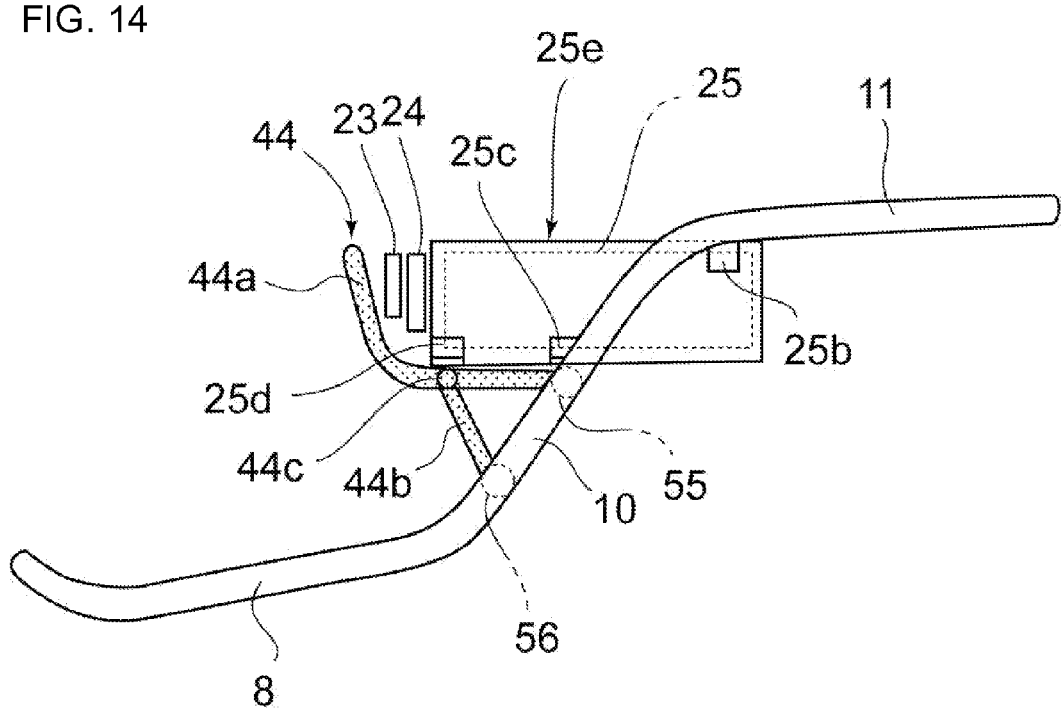
FIG. 14 is a side view of a battery box according to a variation of this embodiment.

FIG. 14 is a side view of a battery box 25e according to a variation of this embodiment. The same reference signs as the above denote the same or equivalent elements. In this variation, while the battery box 25e, virtually a rectangular parallelepiped, houses the battery 25, the contactor 23 and BMU 24 are located in front of the battery box 25e in a way to be surrounded by the main pipe 44a of the battery box supporting frame 44. The contactor 23 and BMU 24 may be fixed on the main pipe 44a. The battery box 25e is fixed on the cross member 44c with the front mounting stays 25d and fastening members such as bolts and also fixed on the upper cross pipe 55 with the central mounting stays 25c, and further fixed on the rear frames 11 with the rear mounting stays 25b. The shapes of the battery box and mounting stays and the locations of the mounting stays may be modified in various ways.

Figure 5:
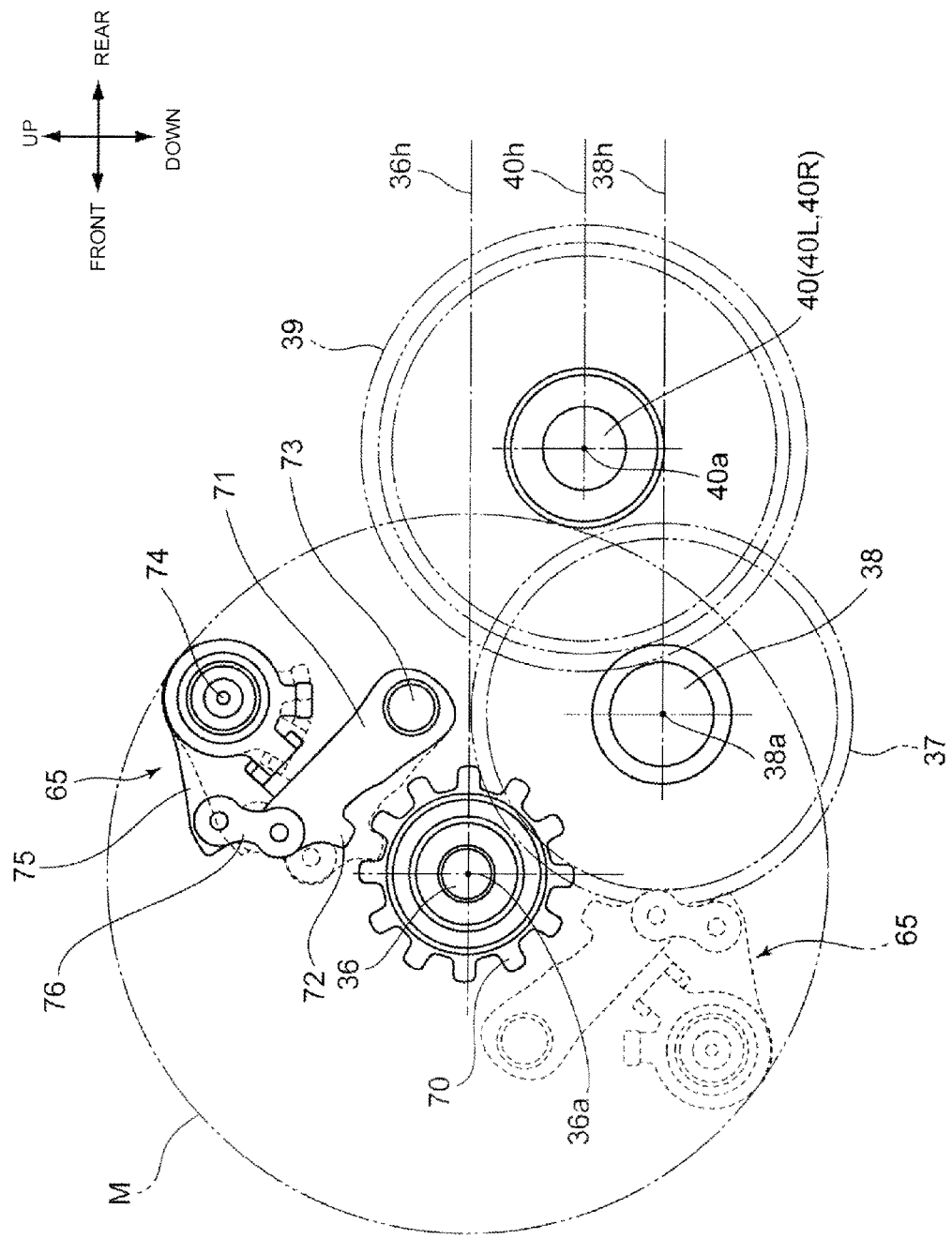
FIG. 5 is a side view of the vehicle showing the arrangement of main axes in the power unit.

FIG. 5 is a side view of the vehicle body showing the arrangement of main axes of the power unit P. The power unit P according to this embodiment is structured so as to transmit the rotary driving power of the motor M to the axle 40 (40L, 40R) through the counter shaft 38. At this time, when axis center 36a is the axis center of the motor output shaft 36 of the motor M, axis center 38a is the axis center of the counter shaft 38, and axis center 40a is the axis center of the axle 40, the axis center 36a, axis center 38a, and axis center 40a are arranged in the order of mention from the vehicle forward side in the vehicle longitudinal direction.

In the vehicle vertical direction, as indicated by horizontal lines 36h, 38h, and 40h passing through the axis centers 36a, 38a, and 40a, the axis centers 36a, 40a, and 38a are arranged in the order of mention from the vehicle upper direction. In other words, in the vehicle vertical direction, the axis center 38a of the counter shaft 38 is located between the axis center 36a of the motor output shaft 36 and the axis center 40a of the axle 40. Also, the axis center 38a of the counter shaft 38 is located below the line L connecting the axis center 36a of the motor output shaft 36 and the axis center 40a of the axle 40. Consequently, the distance between the motor output shaft 36 and the axle 40 in the vehicle longitudinal direction can be as short as possible so that the dimension of the power unit P in the vehicle longitudinal direction is decreased.

According to the above configuration, for example, the dimension in the vehicle longitudinal direction can be smaller than in a configuration that the motor output shaft, counter shaft and axle are arranged in a row in the vehicle longitudinal direction. In addition, it is possible to arrange so that no components exist on the vehicle rearward side of the motor M except the axle 40, making it possible to increase the outside diameter of the motor without interfering with the axle 40.

Consequently, by making the outside diameter of the motor M close to the axle 40 to the extent that it does not interfere with the axle 40, the motor output power can be increased with the enlargement of the motor outside diameter, which means that the dimension of the motor in its thickness direction can be decreased and the dimension of the power unit in the vehicle transverse direction can be decreased. In addition, since a centrifugal clutch 80 is provided coaxially with the motor, the torque of the motor M can be efficiently transmitted to the rear wheels WR at low revolution speed.

Also the power unit P can have a parking lock mechanism 65 to prevent the rear wheels WR from rotating during a stop on a slope or the like. The parking lock works when the protrusion 72 of a lock arm 71 which is swung by manual operation is engaged with a lock gear 70 fixed on the motor output shaft 36.

Regarding the lock arm 71, which can swing around a spindle 73, its protrusion 72 is away from the lock gear 70 when the parking lock is released. As the occupant operates a parking lock operating lever (not shown) located near the steering handlebar 4, etc., a swing arm 75 which swings around a swing shaft 74 rotates counterclockwise and a link member 76 rotates the lock arm 71 counterclockwise to enable the protrusion 72 of the lock arm 71 to engage with the lock gear 70 (indicated by broken line in the drawing).

As mentioned above, in the power unit P according to this embodiment, the counter shaft 38 is located below the motor output shaft 36 and axle 40, so the parking lock mechanism 65 can be located in the space reserved above it, thereby making it possible that the whole power unit P including the parking lock mechanism 65 is compact. As indicated by the broken line in the drawing, the parking lock mechanism 65 can be located below the motor output shaft 36 and counter shaft 38.

Figure 6:
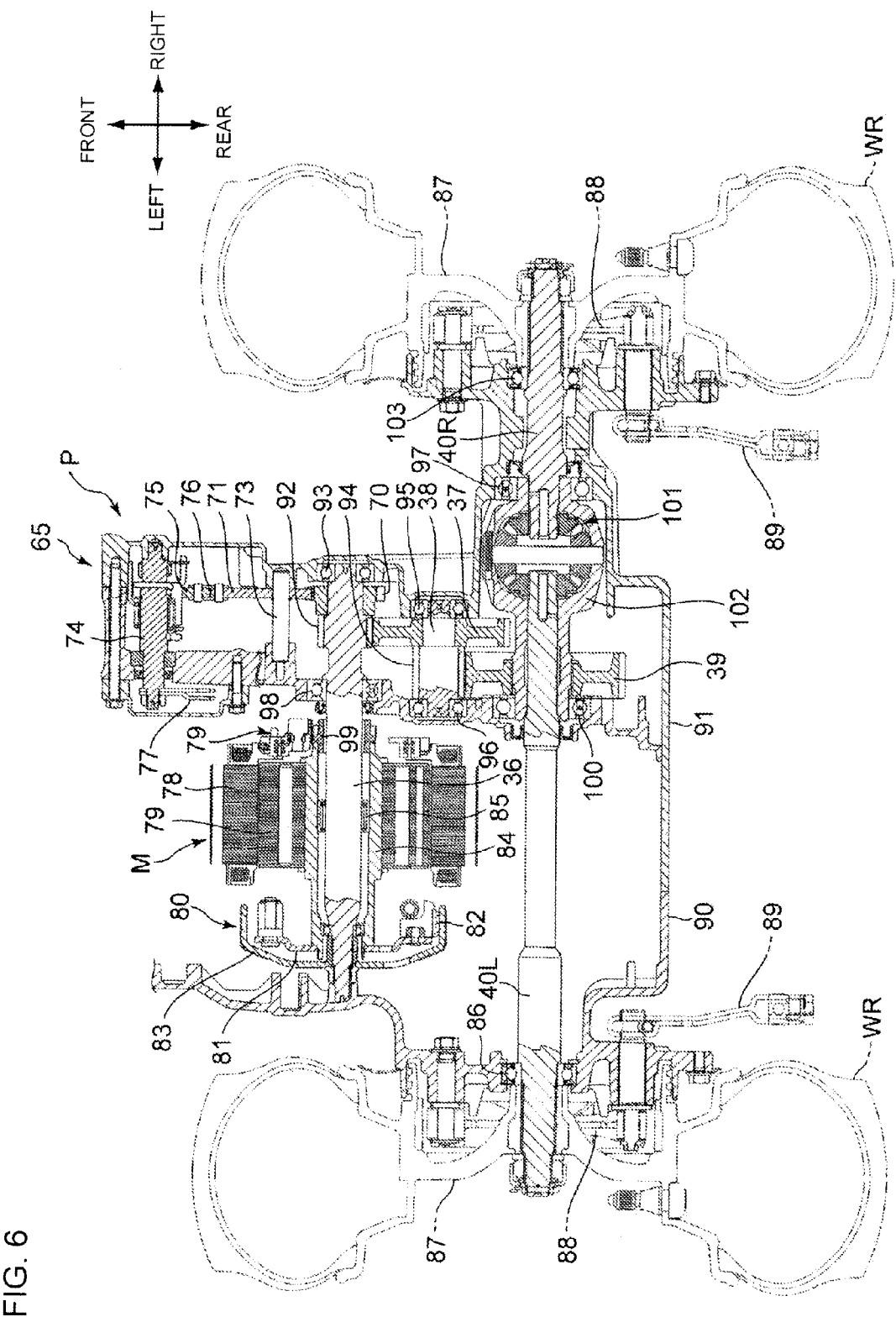
FIG. 6 is a sectional plan view of the power unit according to this embodiment.
Figure 7:
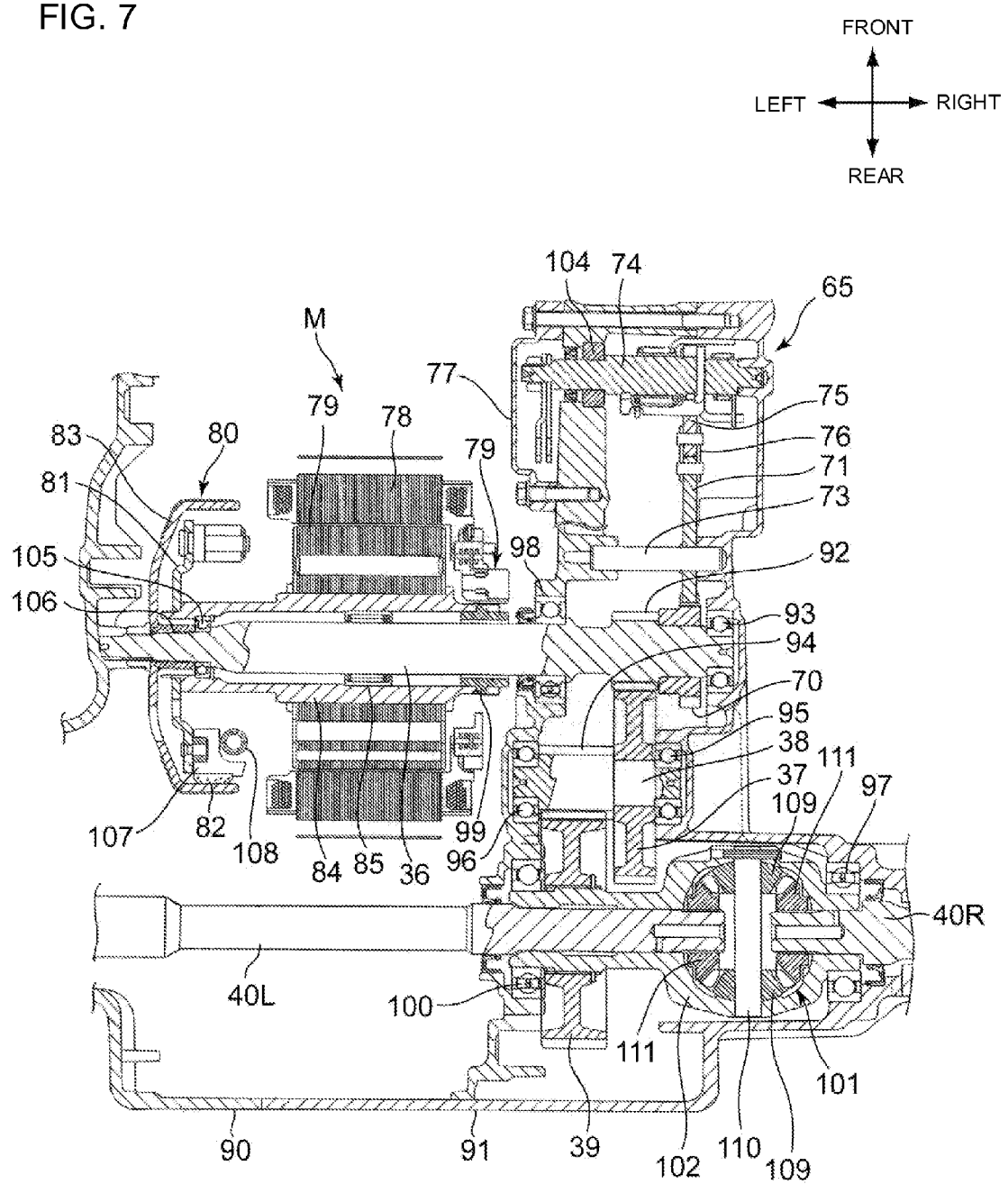
FIG. 7 is a fragmentary enlarged view of FIG. 6.

FIG. 6 is a sectional plan view of the power unit P according to this embodiment. FIG. 7 is a fragmentary enlarged view of FIG. 6. The power unit P is so structured as to transmit the rotary driving power of the motor M to the differential mechanism 101 of the rear wheels WR through the centrifugal clutch 80 and counter shaft 38. The power unit P does not have a transmission and is structured so that when the revolution speed (the number of rotations) of the motor M exceeds a prescribed value, transmission of power to the rear wheels WR begins and the vehicle speed increases in proportion to the revolution speed of the motor M.

The inner rotor motor M is comprised of a stator 78 fixed on a right case 91 and a rotor 79 fixed on an outer motor output shaft 84 located outside the motor output shaft 36. The motor M can have a large outside diameter to the extent that it does not interfere with the axle 40, because there are no other gears, etc. on the vehicle forward and rearward sides thereof. The outer motor output shaft 84 is journaled to the motor output shaft 96 by bearings 85 and 105 in a rotatable manner.

The centrifugal clutch 80 is located at the left end of the motor output shaft 36 as seen in the drawing. While a disc clutch inner 81 is fixed at the left end of the outer motor output shaft 84 as seen in the drawing, a bottomed cylindrical clutch outer 83 is fixed through a fixing member 106 at the left end of the motor output shaft 36 as seen in the drawing.

When the revolution speed of the motor M exceeds a prescribed value, or the revolution speed of the clutch inner 81 exceeds a prescribed value, a plurality of weight rollers 108 move outward in the radial direction by a centrifugal force. In response, a clutch shoe 107 having a friction material 82 touches the clutch outer 83 and the rotary driving power of the clutch inner 81 is transmitted to the clutch outer 83. An object to be sensed 99, a magnet, is provided at the right end of the outer motor output shaft 84 as seen in the drawing for a motor revolution speed sensor 79 to detect the motor revolution speed.

The motor output shaft 36 is journaled to bearings 98 and 93 of the right case 91 on the right as seen in the drawing. The rotary driving power of the motor output shaft 36 is transmitted to the counter shaft 38 through the counter gear 37 engaged with a gear 92 formed on the motor output shaft 36. The rotary driving power of the counter shaft 38 pivotally supported by the bearings 95 and 96 is transmitted to the differential case 102 of the differential mechanism 101 through an output gear 39 engaged with a gear 94 formed on the counter shaft 38.

According to the above configuration, power transmission from the motor output shaft 36 to the axle 40 can be achieved by a smaller number of components and a simple configuration. Also, the length of the counter shaft 38 can be decreased.

The lock gear 70 of the parking lock mechanism 65 is fixed at the right end of the motor output shaft 36 as seen in the drawing. The lock arm 71 is welded to a spindle 73 and pivotally supported in a way that the spindle 73 can rotate with respect to the case part. A swing arm 75 which is engaged with the lock arm 71 through a link member 76 is fixed on a swing shaft 74 pivotally supported by a bearing 104. A working arm 77 which is connected with an operating wire (not shown) is fixed at the left end of the swing shaft 74 as seen in the drawing.

The differential case 102 is pivotally supported by bearings 97 and 100 of the right case 91. The differential mechanism 101 has a pair of pinion gears 109 pivotally supported by a pin 110 and a pair of side gears 111 in the vehicle transverse direction, in which a left axle 40L and a right axle 40R are spline-fitted to the respective side gears 111.

The counter gear 37 and differential case 102 are located so as to overlap each other in a side view of the vehicle in order to make the counter shaft 38 and the differential case 102 as close to each other as possible and reduce the dimension of the power unit P in the vehicle longitudinal direction.

While the left axle 40L is journaled to a bearing 86 of the left case 90 and fixed on a wheel 87, the right axle 40R is journaled to a bearing 103 of the right case 91 and fixed on a wheel 87. A brake shoe 88 which is activated according to a brake arm 89 to be swung by a wire, etc. is housed in both the wheels 87.

In the power unit P according to this embodiment, the centrifugal clutch 80, motor M, counter shaft 38, and differential mechanism 101 are distributively arranged in the order of mention from the left in the vehicle transverse direction in a plan view of the vehicle so that the motor M with a large outside diameter and the differential mechanism 101 are located on the left and right sides of the counter shaft 38 to make the distance between the motor output shaft 36 and the axle 40 shorter.

Figure 8:
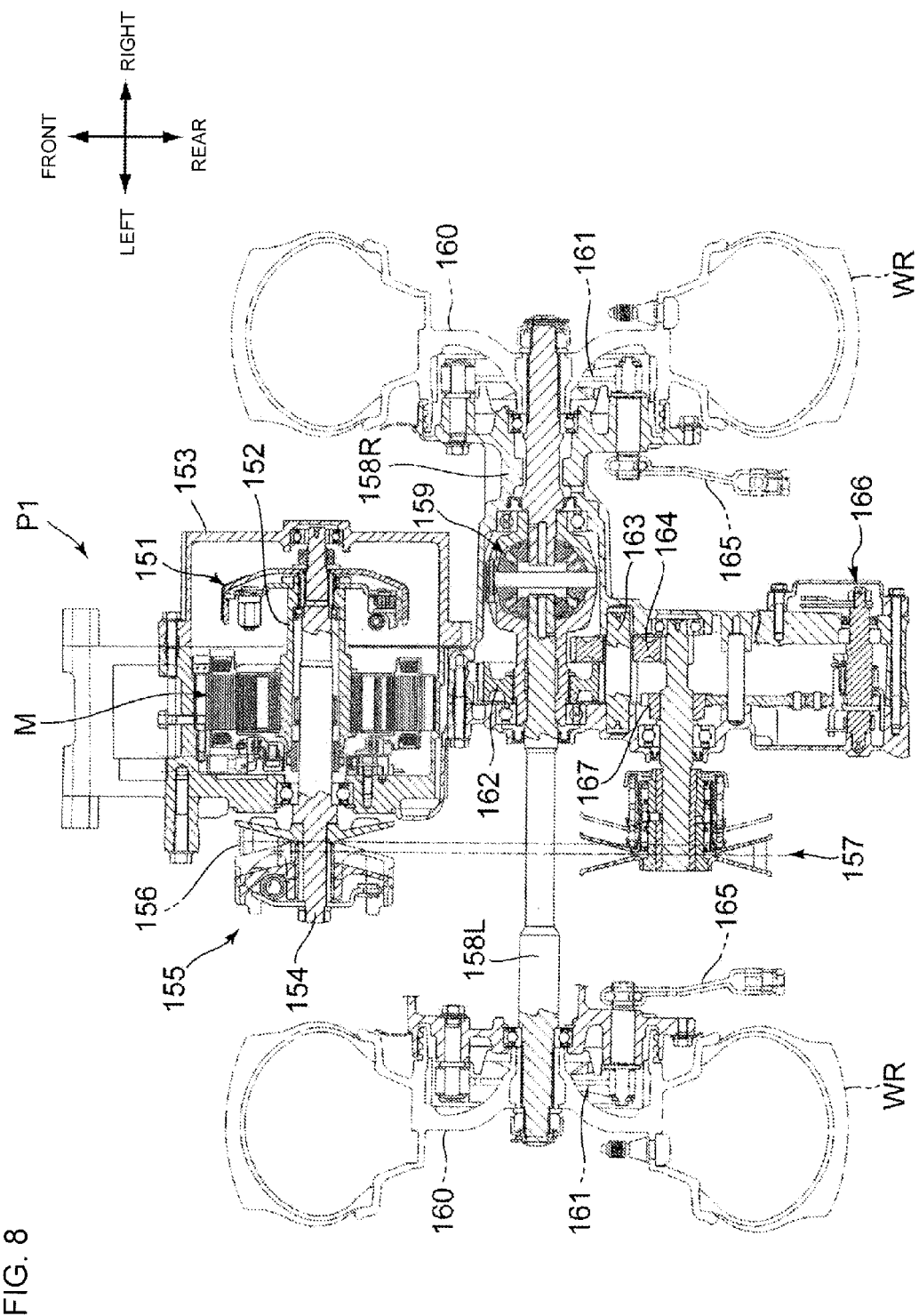
FIG. 8 is a sectional plan view of a power unit according to a second embodiment of the present invention.
Figure 9:
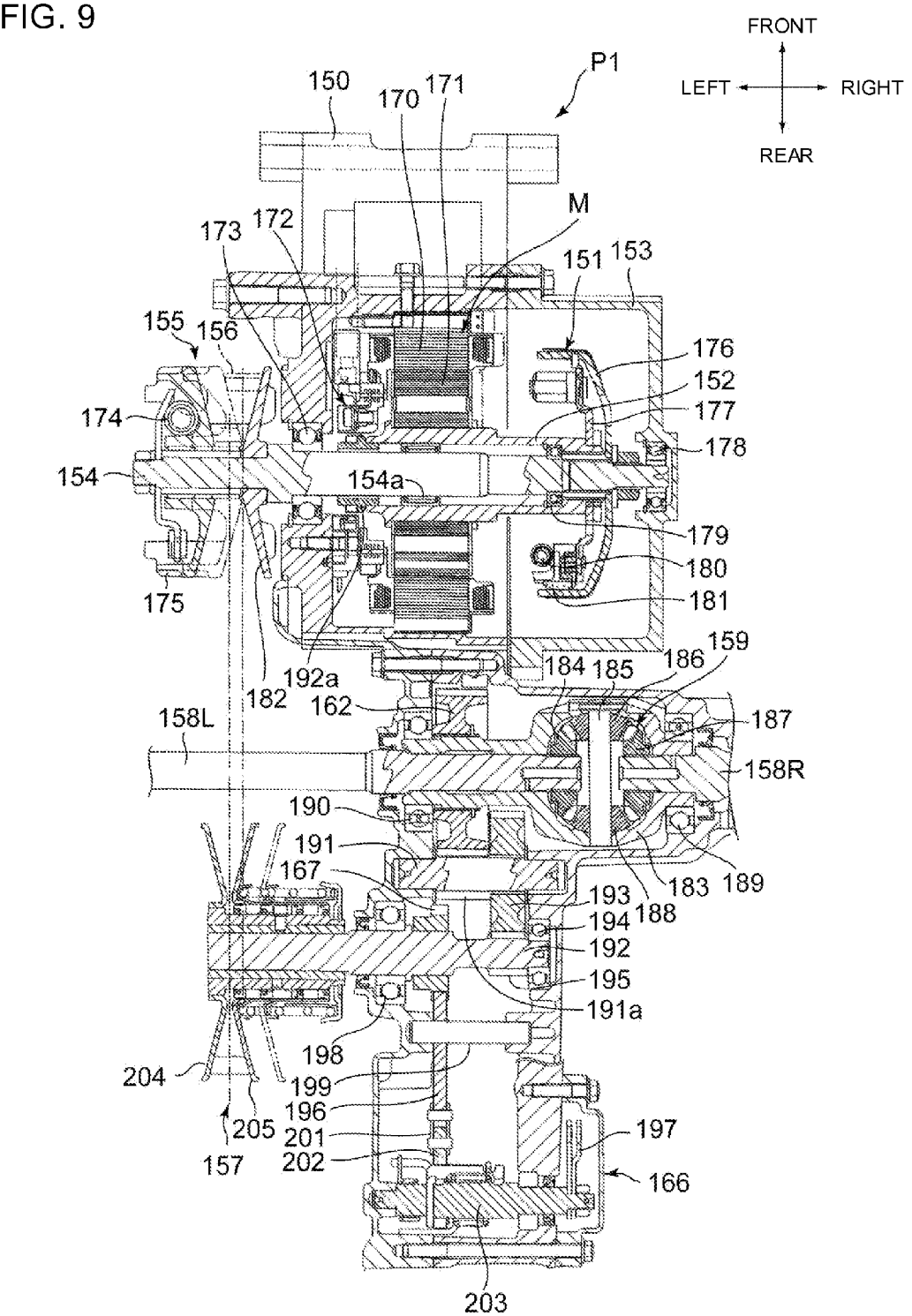
FIG. 9 is a fragmentary enlarged view of FIG. 8.

FIG. 8 is a sectional plan view of a power unit P1 according to a second embodiment of the present invention. FIG. 9 is a fragmentary enlarged view of FIG. 8. The power unit P1 is so structured as to transmit the rotary driving power of the motor M to the differential mechanism 159 of the rear wheels WR through a centrifugal clutch 151, a belt converter type continuously variable transmission, and a counter shaft 163.

The inner rotor motor M is comprised of a stator 170 fixed on a case 150 and a rotor 171 fixed on an outer motor output shaft 152. The outer motor output shaft 152 is pivotally supported on the motor output shaft 154 by bearings 154a and 179 in a rotatable manner. While a disc clutch inner 177 is fixed at the right end of the outer motor output shaft 152 as seen in the drawing, a bottomed cylindrical clutch outer 176 is fixed at the right end of the motor output shaft 154 as seen in the drawing.

When the revolution speed of the motor M exceeds a prescribed value, or the revolution speed of the clutch inner 177 exceeds a prescribed value, a plurality of weight rollers 180 move outward in the radial direction by a centrifugal force and in response, a clutch shoe 181 having a friction material touches the clutch outer 176. Consequently, the rotary driving power of the clutch inner 177 is transmitted to the clutch outer 176. An object to be sensed 172a, a magnet, is provided at the left end of the outer motor output shaft 152 as seen in the drawing for a motor revolution speed sensor 172 to detect the motor revolution speed.

The motor output shaft 154 is journaled to a bearing 173 of a housing 150 on the left as seen in the drawing and also journaled to a bearing 178 of a clutch case 153 at the right end as seen in the drawing. A driving variable speed pulley 155 comprised of a fixed pulley half 182 and a movable pulley half 175 is attached to the left end of the motor output shaft 154 as seen in the drawing. As a weight roller 174 moves in the radial direction according to the revolution speed of the motor output shaft 154, the driving variable speed pulley 155 changes the winding diameter of an endless V belt 156 wound between it and a driven pulley 157.

The driven pulley 157, around which the V belt 156 is wound, is attached to a driven shaft 192. The driven pulley 157 includes a fixed pulley half 204 and a movable pulley half 205 and changes its winding diameter according to the winding diameter of the driving variable speed pulley 155 to change the revolution speed of the motor output shaft 154 at a given gear ratio and transmit it to a driven shaft 192. The driven shaft 192 is journaled to bearings 194 and 198 of the case 150.

The rotary driving power of the driven shaft 192 is transmitted to the counter shaft 191 through the counter gear 193 engaged with a gear 196 formed on the driven shaft 192. The rotary driving power of the counter shaft 191 is transmitted to the differential case 183 of the differential mechanism 159 through an output gear 162 engaged with a gear 191a formed on the counter shaft 191.

A lock gear 167 for a parking lock mechanism 166 is fixed on the driven shaft 192. The lock arm 196 is welded or otherwise affixed to a spindle 199 and engaged in a way that the spindle 199 can rotate with respect to the case part. A swing arm 202 which is engaged with the lock arm 196 through a link member 201 is fixed on a swing shaft 203. A working arm 197 which is connected with an operating wire end is fixed at the right end of the swing shaft 203 as seen in the drawing.

The differential case 183 is pivotally supported by bearings 189 and 190 of the case part. The differential mechanism 159 has a pair of pinion gears 186 and 188 pivotally supported by a pin 185 and a pair of side gears 184 and 187 in the vehicle transverse direction, in which a left axle 158L and a right axle 158R are spline-fitted to the respective side gears 184 and 187. While the left axle 158L is fixed on a left wheel 160, the right axle 158R is fixed on a right wheel 160. A brake shoe 161 which is activated according to a brake arm 165 to be swung by a wire, etc. is housed in both the wheels 160.

The electric three-wheeled vehicle structure, the axial arrangement of main axes of the power unit of the rear body, and the arrangement of electric components such as the battery and PDU are not limited to the above embodiments and may be modified in various ways.

REFERENCE SIGNS LIST

1 . . . Electric three-wheeled vehicle
2 . . . Body frame
3 . . . Main frame
8 . . . Side frame
10 . . . Standing frame
11 . . . Rear frame
21 . . . Seat
22 . . . Supporting frame
23 . . . Contactor
24 . . . BMU
25 . . . Battery
26 . . . Rear shock unit
27 . . . Pivot shaft
28 . . . Vertical swing unit
33 . . . PDU
34 . . . Tilting member
36 . . . Motor output shaft
38 . . . Counter shaft
40 (40L, 40R) . . . Axle
44 . . . Battery box supporting frame
45a, 49, 58, 60 . . . Charge port
47 . . . Down regulator
55 . . . Upper cross pipe
56 . . . Lower cross pipe
57 . . . Low-voltage battery
65 . . . Parking lock mechanism
70 . . . Lock gear
80 . . . Centrifugal clutch
101 . . . Differential mechanism
102 . . . Differential case
M . . . Motor
P . . . Power unit
WR . . . Rear wheel

The invention claimed is:

1. An electric vehicle, comprising:
a pair of left and right rear wheels configured to be driven by rotary driving power;
a motor configured to be supplied with electric power from a battery, and to provide the rotary driving power;
a rear body configured to support the motor and the rear wheels, said rear body being attached at a back of a body frame in a vertically swingable and transversely tiltable manner;
a battery box configured to house at least the battery;
a battery box supporting frame joined to the body frame underneath a seat of the electric vehicle, wherein the battery box is supported by the battery box supporting frame;
a monitoring board configured to monitor a state of the battery, said monitoring board being located on a top of the battery;
a battery management unit (BMU) configured to collect information from the monitoring board;
a contactor configured to open and close a connection between the battery and a drive circuit for the motor, wherein the BMU and the contactor are housed in the battery box and disposed between a front facing side of the battery and the battery box supporting frame.

2. The electric vehicle according to claim 1,
wherein the body frame includes a main frame joined to a head pipe for pivotally supporting a steering stem in a rotatable manner, extending downward in a vehicle rearward direction, a pair of left and right side frames joined to the main frame, extending in the vehicle rearward direction, a pair of left and right standing frames joined to the side frames, extending upward in the vehicle rearward direction, and a pair of left and right rear frames joined to the standing frames, extending in the vehicle rearward direction, and
wherein the battery box supporting frame is supported by a cross pipe in a vehicle transverse direction which interconnects the left and right standing frames.

3. The electric vehicle according to claim 1,
wherein the battery box supporting frame is formed so as to extend from the cross pipe toward a vehicle forward direction, and
wherein the battery box is located above the cross pipe and above the battery box supporting frame.

4. The electric vehicle according to claim 1, further comprising a charge port configured to be connected with an external power supply to charge the battery, said charge port being disposed at a top of the contactor.

5. The electric vehicle according to claim 1, further comprising:
a supporting frame standing upward from the body frame behind the seat;
a down regulator configured to decrease a voltage of an external power supply for charging the battery, said down regulator being attached to the supporting frame.

6. The electric vehicle according to claim 5, further comprising a charge port disposed on a vehicle center area of the forward side of the supporting frame.

7. The electric vehicle according to claim 1, further comprising:
- a low-voltage battery located below the seat; and
- a charge port disposed between the contactor and the low-voltage battery.

8. The electric vehicle according to claim 1, further comprising a PDU as a motor control device, said PDU being located in front of the motor.

9. The electric vehicle according to claim 1, wherein the electric vehicle comprises a three-wheeled electric vehicle.

10. An electric vehicle, comprising:
- a pair of left and right rear wheels for being driven by rotary driving power;
- motor means for providing the rotary driving power, said motor means also for being supplied with electric power from an energy storage means;
- rear body means for supporting the motor means and the rear wheels, said rear body means being attached at a back of a body frame in a vertically swingable and transversely tiltable manner;
- box means for housing the energy storage means;
- first supporting frame means for supporting the box means, said first supporting frame means joined to the body frame underneath a seat of the electric vehicle, wherein the box means is supported by the first supporting frame means;
- monitoring means for monitoring a state of the energy storage means, said monitoring means being located on a top of the energy storage means;
- management means for collecting information from the monitoring means;
- contactor means for opening and closing a connection between the energy storage means and a drive circuit for the motor means, wherein the management means and the contactor means are housed in the box means, and disposed between a front facing side of the energy storage means and the first supporting frame means.

11. The electric vehicle according to claim 10, wherein the body frame includes a main frame joined to a head pipe for pivotally supporting a steering stem in a rotatable manner, extending downward in a vehicle rearward direction, a pair of left and right side frames joined to the main frame, extending in the vehicle rearward direction, a pair of left and right standing frames joined to the side frames, extending upward in the vehicle rearward direction, and a pair of left and right rear frames joined to the standing frames extending in the vehicle rearward direction, and wherein the first supporting frame means is supported by a cross pipe in a vehicle transverse direction which interconnects the left and right standing frames.

12. The electric vehicle according to claim 10, wherein the first supporting frame means is formed so as to extend from the cross pipe toward a vehicle forward direction, and wherein the box means is disposed above the cross pipe and above the supporting frame means.

13. The electric vehicle according to claim 10, further comprising charge port means for being connected with an external power supply to charge the energy storage means, said charge port means being disposed at a top of the contactor means.

14. The electric vehicle according to claim 10, further comprising:
- second supporting frame means standing upward from the body frame behind the seat;
- down regulator means for decreasing a voltage of the external power supply for charging the energy storage means, said down regulator means being attached to the second supporting frame means.

15. The electric vehicle according to claim 14, further comprising charge port means for being connected with an external power supply to charge the energy storage means, said charge port means being disposed on a vehicle center area of the forward side of the second supporting frame means.

16. The electric vehicle according to claim 10, further comprising:
- low-voltage battery means for providing a low voltage, said low-voltage battery means being disposed below the seat; and
- charge port means for being connected to an external power supply, said charge port means being disposed between the contactor means and the low-voltage battery means.

17. The electric vehicle according to claim 10, further comprising motor control means, said motor control means being disposed in front of the motor means.

18. The electric vehicle according to claim 10, wherein the electric vehicle comprises a three-wheeled electric vehicle.

* * * * *